Sept. 15, 1931.  H. G. JUNGK  1,823,607
BAND WIRE CLIP
Filed Jan. 20, 1930

INVENTOR
*Herbert G. Jungk.*
BY
*Wesley H. Barr*
ATTORNEY

Patented Sept. 15, 1931

1,823,607

UNITED STATES PATENT OFFICE

HERBERT G. JUNGK, OF WILKINSBURG, PENNSYLVANIA, ASSIGNOR TO WESTINGHOUSE ELECTRIC & MANUFACTURING COMPANY, A CORPORATION OF PENNSYLVANIA

BAND-WIRE CLIP

Application filed January 20, 1930. Serial No. 421,932.

My invention relates to clips for embracing the band-wires which retain the conductors on the rotor member of a dynamo-electric machine.

Armature bands sometimes become overheated in service, and throw solder. This always starts at the band clip, that is, where the small strip of tinned steel or copper sheet is wrapped around the band and soldered.

It is the object of my invention to provide a novel form and arrangement of the band clip to obviate this difficulty.

Figure 1:
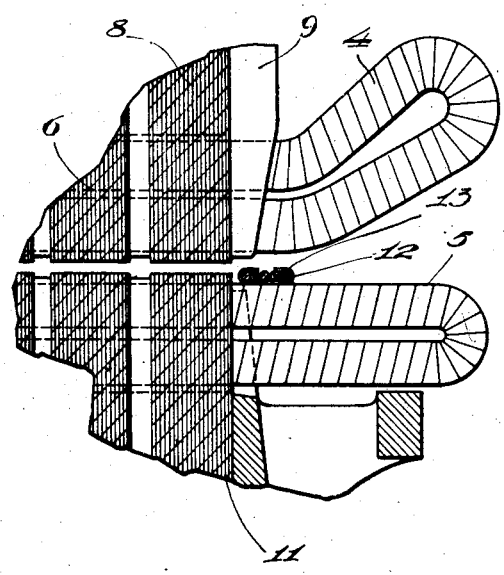
Figure 2:
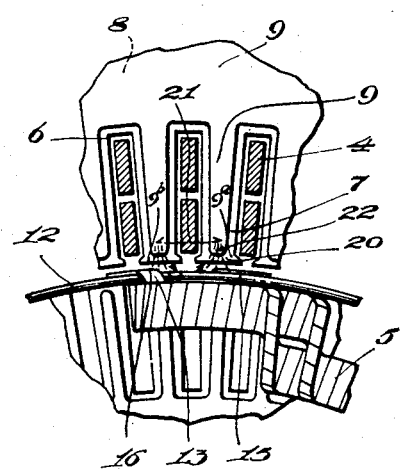
Figure 3:
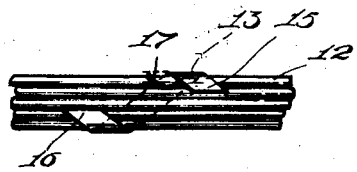

My invention will best be understood by reference to the accompanying drawings, wherein Figure 1 is a fragmentary longitudinal sectional view of one end of a dynamo-electric machine embodying my invention, Fig. 2 is a diagrammatic end view of the parts shown in Figure 1, with the stator windings shown in section, and Fig. 3 is a fragmentary plan view of the band-wire of Figure 1, with my new clip in place.

My invention is particularly adapted to be applied to an alternating-current dynamo-electric machine, such as a single-phase commutator railway motor, having peripherally disposed stator windings 4 and peripherally disposed rotor windings 5, the stator having open slots 6 which provide teeth 7 therebetween. The stator punchings 8 are usually retained by a so-called finger-plate 9 which is usually made of steel or other magnetic material.

The rotor winding 5 extends out horizontally from the rotor core 11 and is held in place, against centrifugal force, by a multiple-turn band-wire 12, usually made of steel wire in order to obtain adequate strength, encircling such winding-extension near the rotor core 11. The turns of the band-wire are bound together by a band-wire clip 13 which is a small piece of thin sheet metal folded around the band-wire and soldered thereto.

As hereinbefore constructed, the band-wire clip 13 has been folded directly around the band-wire, so that its sides were at right angles to the band-wire, and its two ends were joined together on the top of the band-wire by means of the solder by which the clip was fastened in place. It is my belief that the excessive heating of such clips, resulting in the melting of the solder, has been caused by the local leakage fluxes which pass from one finger or tooth of the stator member to the next one, or from one stator pole to the next stator pole, as said leakage fluxes find a return path in the steel band-wire. The variation in the flux may occur either at a frequency determined by the number of teeth and the speed, or at some higher harmonic of the line frequency. In either case, however, the band-wire, as a magnetic path, is linked by the clip which, as previously constructed, constitutes a one-turn short-circuited coil with little resistance. This results in an induced voltage and heavy currents in the clip.

Referring, now, to Fig. 3, I have shown a new style of clip 13 which was developed and applied to a single-phase commutator railway motor. The sheet metal of the clip has two ends 15 and 16 which are bent at an agle of from 20° to 30°, as indicated at 17. The clip is then bent over the band-wire 12 and secured in the usual manner, except that the body portion of the clip, instead of extending at right angles to the band-wire, extends at an angle of 60° to 70° thereto, which causes the ends 15 and 16 of the clip to be separated by a circumferential difference along the band-wire, as clearly indicated. It will be noted that the effective width of the clip-ends 15 and 16 at the 20° or 30° angle 17 is at least twice as wide as the width of the narrow sheet-metal strip constituting the clip, which means that the strip may be made narrower than heretofore, thus additionally decreasing the short-circuit current by raising the resistance.

Where the leakage fluxes from tooth to tooth of the stator member are the main source of heating, my helically disposed band-wire clip 13 may be so proportioned that one end 15 of the clip folds over under one tooth 9ª, while the other end 16 folds over under another tooth 9ᵇ, the total circumferential length of the clip being about equal to twice the stator tooth-pitch 21, as indicated in Fig. 2. The transformer voltages and the rotational induced voltages resulting from the rotation of the clip in the fluxes from tooth to tooth of the stator member thus tend to oppose each other, as indicated by the flux lines and arrows 22 in Fig. 2, thereby reducing the losses which cause heating.

My clip is easy to apply and has the same mechanical advantages as the normal or usual clip. In addition, the helical construction or disposition tends to reduce the losses resulting from pole-to-pole leakage as well as the losses resulting from flux leakages from tooth to tooth of the stator member.

I claim as my invention:

1. An electrical machine having a cylindrical rotor core member having peripherally disposed windings thereon and a multiple-turn band-wire encircling said windings, characterized by having a varying flux traversing said band-wire, and characterized further by having a band-wire clip comprising a piece of sheet-metal having one end bent around one side edge of the band-wire and having the other end bent around the other side edge of the band-wire at a circumferentially removed point.

2. A dynamo-electric machine of the type having peripherally disposed windings on both stator and rotor, the stator having at least partially open slots providing teeth, and a multiple-turn band-wire encircling the rotor windings, characterized by having a varying flux traversing said band-wire, and characterized further by having a band-wire clip comprising a piece of sheet-metal having one end bent around one side edge of the band-wire and having the other end bent around the other side edge of the band-wire at a circumferentially removed point.

3. A dynamo-electric machine of the type having peripherally disposed windings on both stator and rotor, the stator having at least partially open slots providing teeth, and a multiple-turn band-wire encircling the rotor windings, characterized by having a varying flux traversing said band-wire, and characterized further by having a band-wire clip comprising a piece of sheet-metal having one end bent around one side edge of the band-wire and having the other end bent around the other side edge of the band-wire at a circumferentially removed point spaced by an angular distance equal to more than one tooth-pitch of the stator teeth.

4. A dynamo-electric machine of the type having peripherally disposed windings on both stator and rotor, the stator having at least partially open slots providing teeth, and a multiple-turn band-wire encircling the rotor windings, characterized by having a varying flux traversing said band-wire, and characterized further by having a band-wire clip comprising a piece of sheet-metal having one end bent around one side edge of the band-wire and having the other end bent around the other side edge of the band-wire at a circumferentially removed point, the circumferential length of the clip being about equal to two tooth-pitches of the stator teeth.

5. An electrical machine having a cylindrical rotor core member having peripherally disposed windings thereon and a multiple-turn band-wire encircling said windings, characterized by having a varying flux traversing said band-wire, and characterized further by having a band-wire clip comprising a narrow piece of sheet-metal disposed in helical relation to the band-wire and having a circumferential length about equal to two tooth-pitches of the stator teeth.

6. An electrical machine having rotor windings and a multiple-turn band-wire encircling said windings, characterized by having a band-wire clip comprising a piece of sheet-metal having one end bent around one side edge of the band-wire and having the other end bent around the other side edge of the band-wire at a circumferentially removed point.

7. A dynamo-electric machine of the type having peripherally disposed windings on both stator and rotor, and a multiple-turn band-wire encircling the rotor windings, characterized by having a varying flux traversing said band-wire, and characterized further by having a band-wire clip comprising a piece of sheet-metal having one end bent around one side edge of the band-wire and having the other end bent around the other side edge of the band-wire at a circumferentially removed point.

In testimony whereof, I have hereunto subscribed my name this 11th day of January, 1930.

HERBERT G. JUNGK.